No. 832,208. PATENTED OCT. 2, 1906.
F. B. PHILLIPS & J. KESSLER.
SASH BAR.
APPLICATION FILED JULY 27, 1905.

Witnesses
O. B. Baenziger
I. G. Howlett

Inventors:
Frederick B. Phillips.
John Kessler.
By T. A. Wheeler & Co. attys.

UNITED STATES PATENT OFFICE.

FREDERICK B. PHILLIPS AND JOHN KESSLER, OF DETROIT, MICHIGAN, ASSIGNORS TO JOHN PHILLIPS & CO., LTD., OF DETROIT, MICHIGAN.

SASH-BAR.

No. 832,208.

Specification of Letters Patent.

Patented Oct. 2, 1906.

Application filed July 27, 1905. Serial No. 271,473.

*To all whom it may concern:*

Be it known that we, FREDERICK B. PHILLIPS and JOHN KESSLER, citizens of the United States, residing at Detroit, in the county of Wayne, State of Michigan, have invented certain new and useful Improvements in Sash-Bars; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a sash-bar especially designed for show-window construction; and it consists in the combination and association of parts hereinafter more fully set forth and pointed out particularly in the claims.

The object of the invention is to produce an inexpensive, strong, and durable sash-bar wherein the arrangement is such as to enable the window to be glazed from the outside and wherein provision is made for firmly securing the glass in place.

The above object is attained by the structure illustrated in the accompanying drawings, in which—

Figure 3:
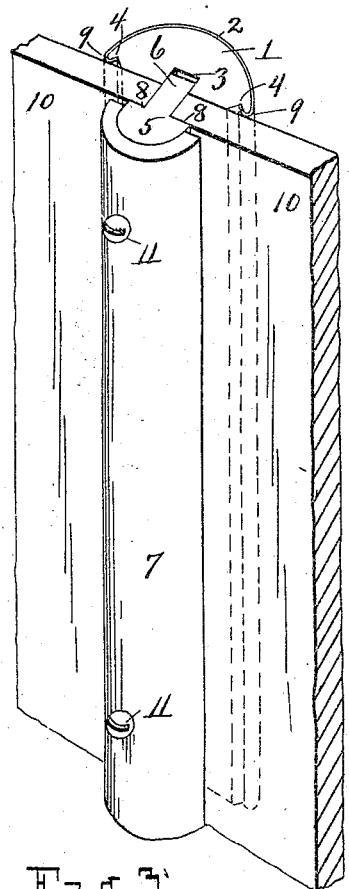
Figure 1:
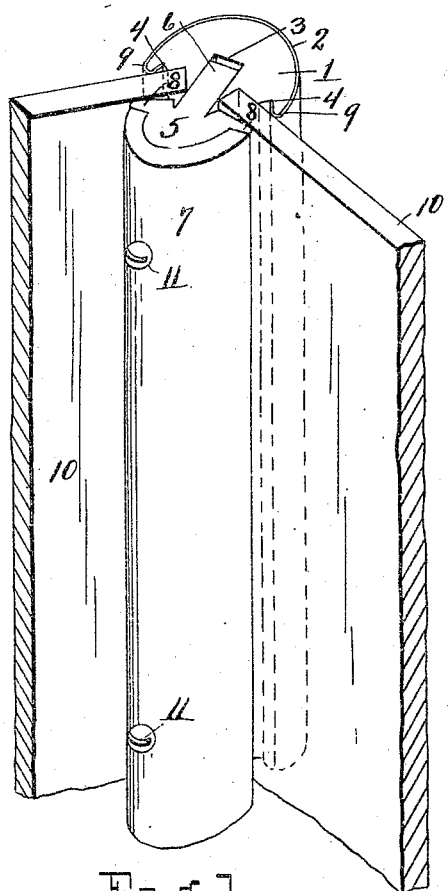
Figure 4:
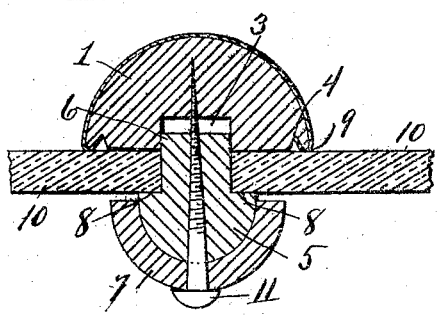
Figure 2:
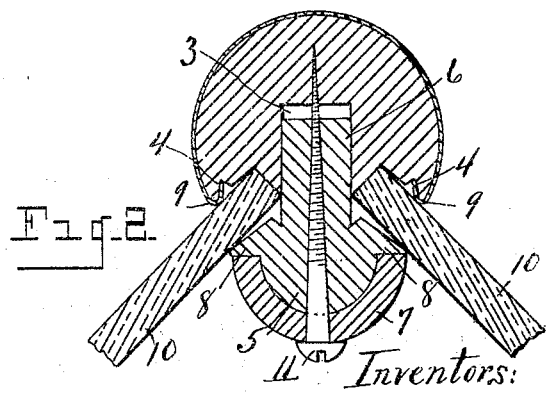

Figure 1 is a perspective view of a sash-bar embodying our invention supporting two panes of glass standing at an angle to each other, as for a corner or a vestibule-entrance. Fig. 2 is a horizontal section through Fig. 1. Fig. 3 is a perspective view showing the construction when the invention is used as a transom-bar or when joining two planes of glass extending in the same plane. Fig. 4 is a horizontal section through Fig. 3.

Referring to the characters of reference, 1 indicates the outer strip of molding covered with a metallic sheath 2 of tin or copper and having a central groove 3. The edges of the metal sheath are turned around the margins of the molding in a hook-shape formation, as shown at 4, whereby said sheath is retained in place. The inner bar 5 is provided with a tongue 6, which enters the groove in the molding-strip and is provided with an embracing semicylindrical reinforcing-strip 7, of iron, whereby the bar 5 is rendered strong and rigid.

In the construction shown in Figs. 1 and 2 the edges of the half-round reinforcing-iron bear against the lateral shoulders 8, projecting from the bar 5, between which and the rounded margins 9 of the metal sheath the edges of the panes of glass 10 are confined. By interposing the shoulders 8, of wood, between the edges of the iron reinforcement and the glass liability of breaking the glass is obviated.

The bar 5 and its reinforcement of half-round iron are secured to the strip of molding 1 by means of the screws 11, which pass through said iron and bar and enter said molding, whereby the parts are drawn together to firmly clamp the margins of the glass between them. It will be noted that the shape of the channel formed between the bar and molding in which the edges of the panes of glass are secured is such as to enable said panes to be adjusted at an angle other than a right angle within reasonable limits.

The structure shown in Figs. 1 and 2 is designed to support the glass with the panes standing nearly at right angles. Should it be desired to use the bar in supporting panes of glass which stand in such relation as to describe an obtuse or an acute angle, it would be necessary to construct a bar especially for such use, although the slight change made therein would not involve a departure from the spirit of the invention.

When it is desired to support panes of glass extending in the same plane or when used as a transom-bar, the construction shown in Figs. 3 and 4 is employed, wherein the shoulders 8, which bear against the glass, do not extend under the edges of the reinforcing-iron 7, but project beyond the edges of said iron sufficiently to prevent their contact with the glass. In other respects the construction shown in Figs. 3 and 4 is substantially that shown in Figs. 1 and 2.

By means of this improved sash-bar a window may be glazed from the outside, obviating the necessity of carrying the glass within the building.

The tongue 6 of the bar entering the groove 8 in the molding prevents any lateral displacement between the molding and bar and also serves as a stop for the edges of the glass.

To render the window water-tight, putty may be placed between the inwardly-turned ends 4 of the metal sheath and the outer face of the glass, whereby a tight closure between said parts is effected when they are drawn together by the set-screws 11. The half-round iron reinforcement, which embraces the bar 5, adds material strength thereto, producing a structure which will resist any wind-pressure to which the glass may be subjected.

Having thus fully set forth our invention, what we claim as new, and desire to secure by Letters Patent, is—

1. In a sash-bar, the combination of the outer molding having a metal sheath with inwardly-turned edges to form a seat for the glass, the wooden bar fitting into said molding having lateral shoulders adapted to bear against the glass, a heavy metallic reinforcement embracing said bar, and means for securing said parts together.

2. In a sash-bar, the combination of the molding having a central groove therein and a shoulder on each side of said groove against which the glass is adapted to bear, a bar having a tongue which enters tightly the groove of the molding and having lateral shoulders adapted to bear against the glass, a heavy reinforcing-bar of metal embracing the first-mentioned bar, its edges abutting against said shoulders remote from the glass, and screws passing through the metallic reinforcement, the bar and into said molding.

In testimony whereof we sign this specification in the presence of two witnesses.

FREDERICK B. PHILLIPS.
JOHN KESSLER.

Witnesses:
E. S. WHEELER,
I. G. HOWLETT.